United States Patent [19]
Shepherd

[11] Patent Number: 5,175,933
[45] Date of Patent: Jan. 5, 1993

[54] PIZZA FORK APPARATUS

[76] Inventor: James S. Shepherd, 58 Ems B33A La., Warsaw, Ind. 46580

[21] Appl. No.: 846,039

[22] Filed: Mar. 5, 1992

[51] Int. Cl.⁵ .......................... A47J 43/28; B26B 3/00; B26B 11/00
[52] U.S. Cl. ........................................ 30/322; 30/129; 30/137
[58] Field of Search ................. 30/323, 322, 360, 148, 30/137, 130, 129; 7/112, 115

[56] References Cited

U.S. PATENT DOCUMENTS

| | | | |
|---|---|---|---|
| 1,083,296 | 1/1914 | Pontious | 30/129 |
| 1,327,438 | 1/1920 | Lewis | 30/137 |
| 2,265,012 | 12/1941 | Thomas | 30/129 |
| 2,873,522 | 2/1959 | Homola | 30/129 |
| 4,103,420 | 8/1978 | Davis | 30/323 |
| 4,826,033 | 5/1989 | Satoh | 30/323 |
| 4,835,864 | 6/1989 | Tang | 30/322 |

FOREIGN PATENT DOCUMENTS 165105 1/1934 Switzerland .................... 30/129

Primary Examiner—Douglas D. Watts
Assistant Examiner—Paul M. Heyrana
Attorney, Agent, or Firm—Leon Gilden

[57] ABSTRACT

A pizza fork is arranged for the ease of cutting and spearing of food items, wherein the pizza fork includes an elongate handle integrally mounting a head at a forward distal end of the handle. The head includes a plurality of spaced tines, wherein the outer tines each include an outer cutting edge arranged in a parallel relationship relative to themselves and the tines. A modification of the invention includes the handle slidably mounting a spatula plate to permit lifting of food components such as pizza subsequent to a cutting procedure.

3 Claims, 4 Drawing Sheets

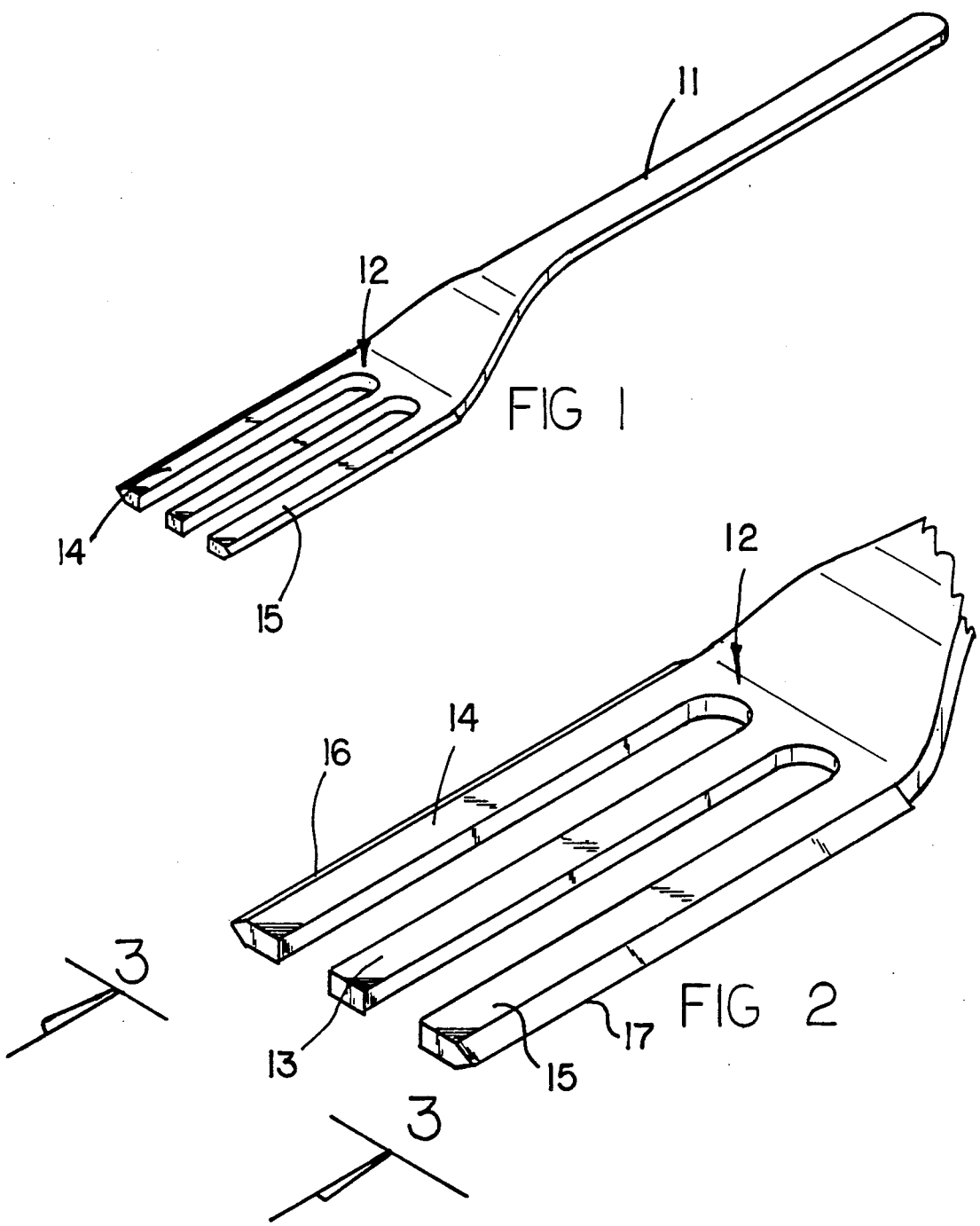

PIZZA FORK APPARATUS

BACKGROUND OF THE INVENTION

1. Field of the Invention

The field of invention relates to fork structure, and more particularly pertains to a new and improved pizza fork apparatus wherein the same is arranged for the severing and lifting of food components.

2. Description of the Prior Art

Fork structure of various types have been utilized throughout the prior art for accommodating various food handling situations. Such structure is exemplified in the U.S. Pat. No. 4,922,611 to Levy wherein the fork includes a combination of a spoon and knife structure mounted within an associated handle of the apparatus.

U.S. Pat. No. 4,771,541 to Bouchakian sets forth a fork including a knife formed with serrations mounted to the head spaced rearwardly of the tines.

U.S. Pat. No. 4,835,864 to Tang sets forth a fork utilizing a fork and spoon combination utilizing interchangeable heads mounted to the associated handle.

As such, it may be appreciated that there continues to be a need for a new and improved pizza fork apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fork apparatus now present in the prior art, the present invention provides a pizza fork apparatus wherein the same utilizes cutting edge structure mounted to the outer edges of tines of the fork structure. As such, the general purpose of the present invention, which will be described subsequently in greater detail, is to provide a new and improved pizza fork apparatus which has all the advantages of the prior art fork apparatus and none of the disadvantages.

To attain this, the present invention provides a pizza fork arranged for the ease of cutting and spearing of food items, wherein the pizza fork includes an elongate handle integrally mounting a head at a forward distal end of the handle. The head includes a plurality of spaced tines, wherein the outer tines each include an outer cutting edge arranged in a parallel relationship relative to themselves and the tines. A modification of the invention includes the handles slidably mounting a spatula plate to permit lifting of food components such as pizza subsequent to a cutting procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pizza fork apparatus which has all the advantages of the prior art fork apparatus and none of the disadvantages.

It is another object of the present invention to provide a new and improved pizza fork apparatus which may be easily and efficiently manufactured and marketed.

It is a further object of the present invention to provide a new and improved pizza fork apparatus which is of a durable and reliable construction.

An even further object of the present invention is to provide a new and improved pizza fork apparatus which is susceptible of a low cost of manufacture with regard to both materials and labor, and which accordingly is then susceptible of low prices of sale to the consuming public, thereby making such pizza fork apparatus economically available to the buying public.

Still yet another object of the present invention is to provide a new and improved pizza fork apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an enlarged isometric illustration of the head portion of the instant invention.

DESCRIPTION OF THE PREFERRED EMBODIMENT

Figure 3:
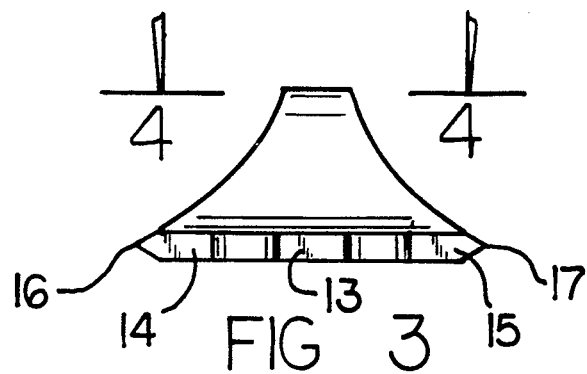
FIG. 3 is an orthographic view, taken along the lines 3—3 of FIG. 2 in the direction indicated arrows.
Figure 4:
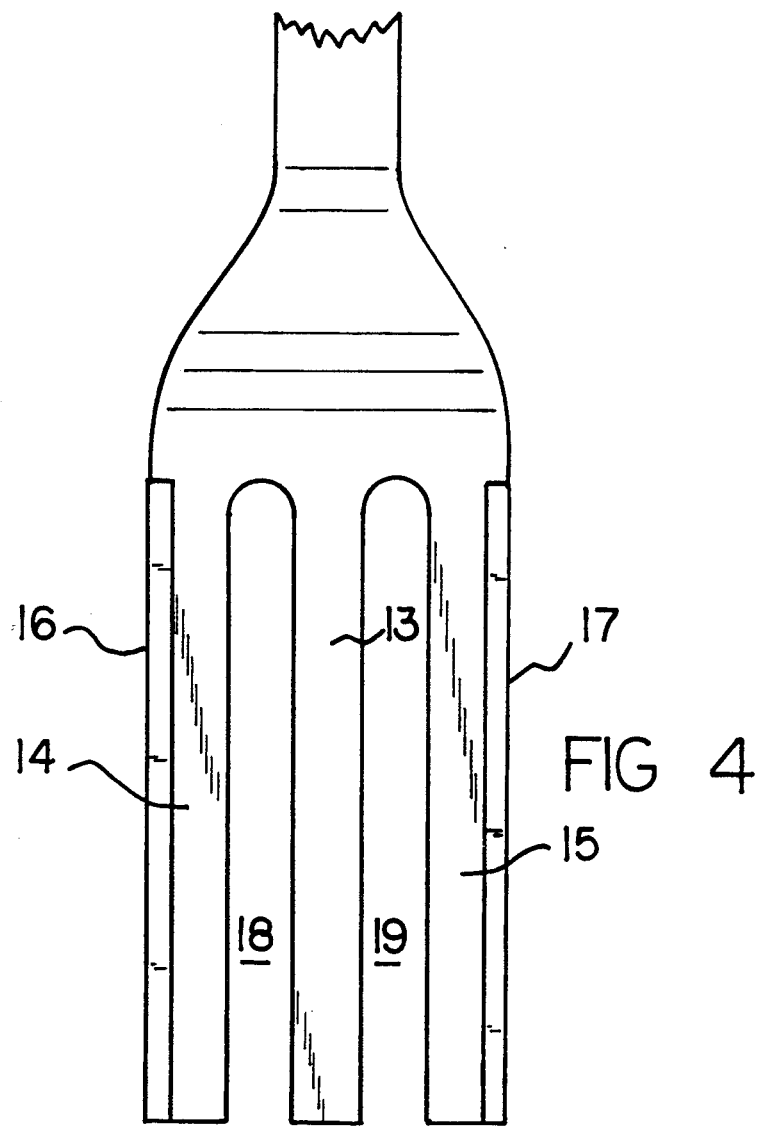
FIG. 4 is an orthographic view, taken along the lines 4—4 of FIG. 3 in the direction indicated by the arrows.

With reference now to the drawings, and in particular to FIGS. 1 to 9 thereof, a new and improved pizza fork apparatus embodying the principles and concepts of the present invention and generally designated by the reference numerals 10 and 10a will be described.

More specifically, the pizza fork apparatus 10 of the instant invention essentially comprises an elongate handle 11, including an integral fork head 12 mounted to a forward distal end of the handle 11, with the fork head 12 including a plurality of parallel tines, each of the tines oriented parallel relative to the handle 11 positioned forwardly thereof. The tines include a medial tine 13, with a right tine 14, and a left tine 15 positioned on opposed sides of the medial tine 13, with the tines including a gap 18 extending from a forward distal end of the head into the head between the right tine 14 and the medial tine 13. A second gap 19 extends in a parallel coextensive relationship relative to the first gap 18, with the second gap 19 extending between the medial tine 13 and the left tine 15. The right tine 14 includes a right cutting outer edge 16 and the left tine 15 includes a left cutting outer edge 17, wherein the cutting edges are arranged in a parallel relationship relative to one another projecting exteriorly of the fork head 12. In this manner, severing and subsequent spearing of various food components may be effected by the fork structure, as set forth in FIGS. 1-4.

Figure 5:
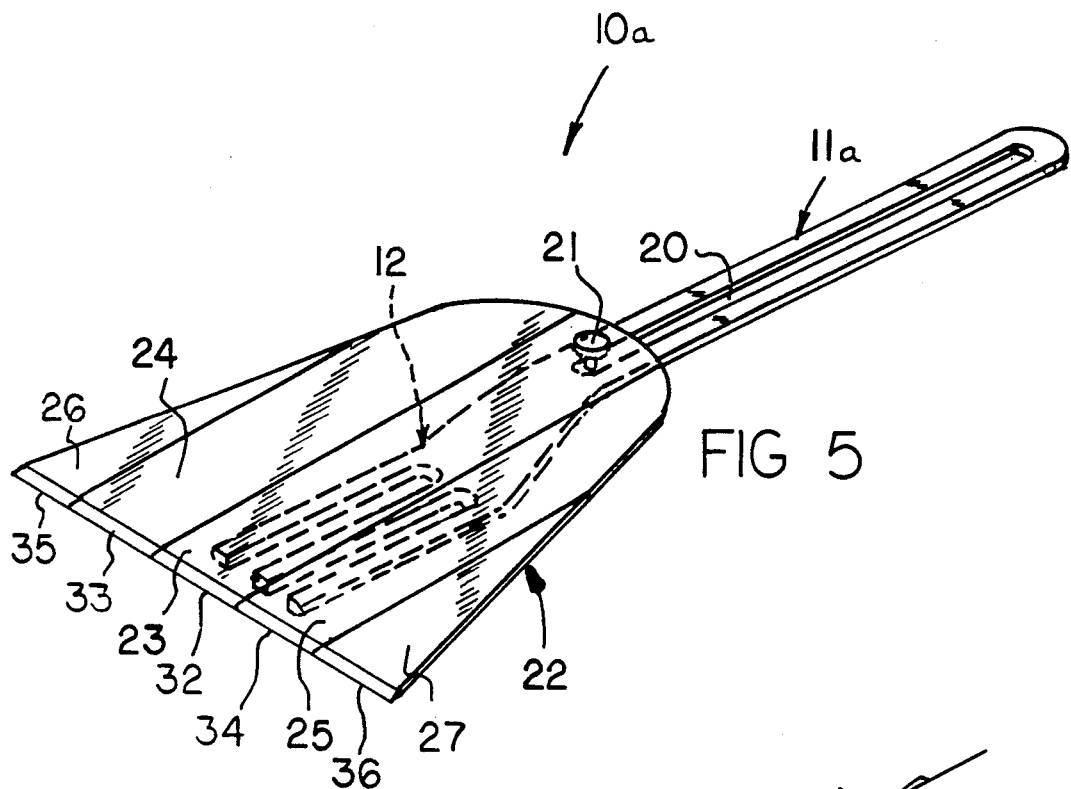
FIG. 5 is an isometric illustration of a modification of the invention.
Figure 6:
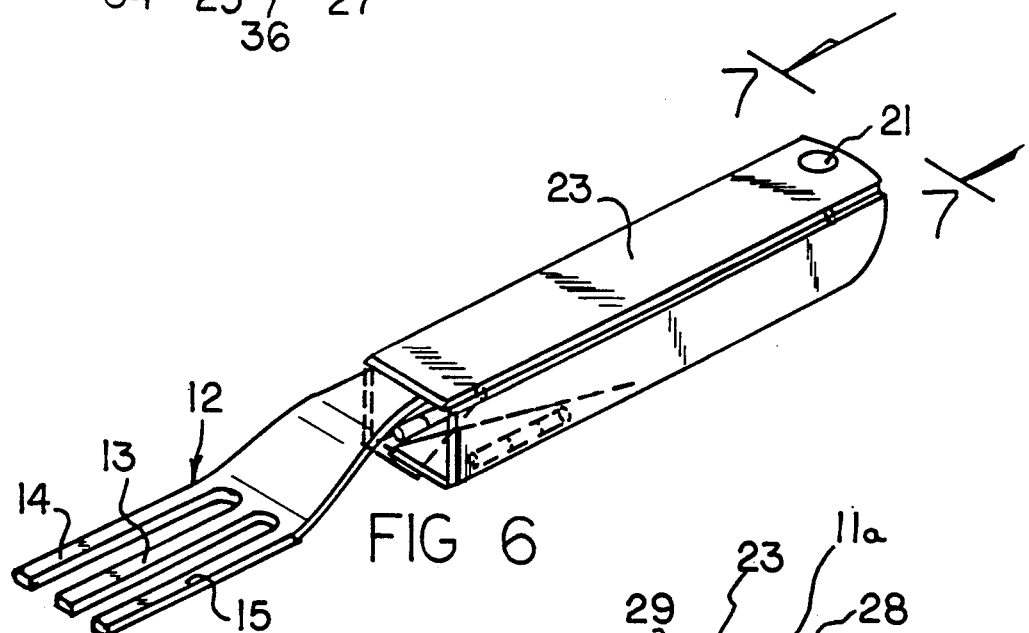
FIG. 6 is an isometric illustration of the invention utilizing the spatula member in a closed configuration about the handle.
Figure 7:
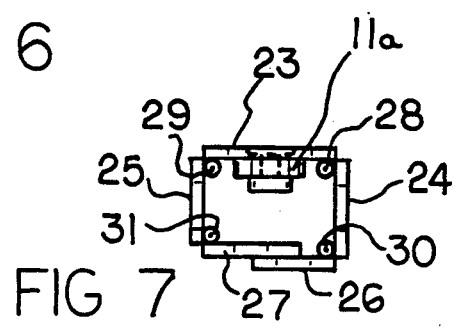
FIG. 7 is an orthographic view, taken along the lines 7—7 of FIG. 6 in the direction indicated by the arrows.

The modified apparatus 10a, as illustrated in the FIGS. 5-9, sets forth a modified handle 11a, including an elongate enclosed slot 20 extending through the handle and contained therewithin positioned medially and longitudinally of the handle. A slider pin 21 is slidably mounted within the slot mounting a spatula member 22 to the handle. The spatula member 22 includes a first plate 23 mounted to the pin 21, with the first plate hingedly mounted to a second plate and third plate 24 and 25 respectively to opposed sides of the first plate coextensive with the first plate. A fourth and fifth plate 26 and 27 respectively are hingedly mounted to the second and third plates 24 and 25 respectively, wherein a first hinge 28 and a second hinge 29 hingedly mount the respective second and third plates 24 and 25 to opposed sides of the first plate 23. Third and fourth hinges 30 and 31 hingedly mount the fourth and fifth plates 26 and 27 to the respective second and third plates 24 and 25. It should be further noted that the hinges 28-31 are arranged in a parallel relationship relative to one another to permit the pivotment of the various plates relative to one another into the first planar position, as illustrated in FIG. 5, from the interfolded position, as illustrated in FIG. 6. The hinges are mounted to the bottom surface of the plates, whereupon rotation of the spatula member effects abutment of confronting edges of each of the plates to provide for a support surface for lifting of a food component, such as a pizza slice thereon subsequent to a cutting procedure by the edges 16 and 17. Each of the respective first through fifth plates 23-27 includes respective first through fifth plate edge 32-36 respectively at a forward end of each of the plates, wherein the edges are arranged in a linearly aligned relationship when the plates are coplanar relative to one another.

Figure 8:
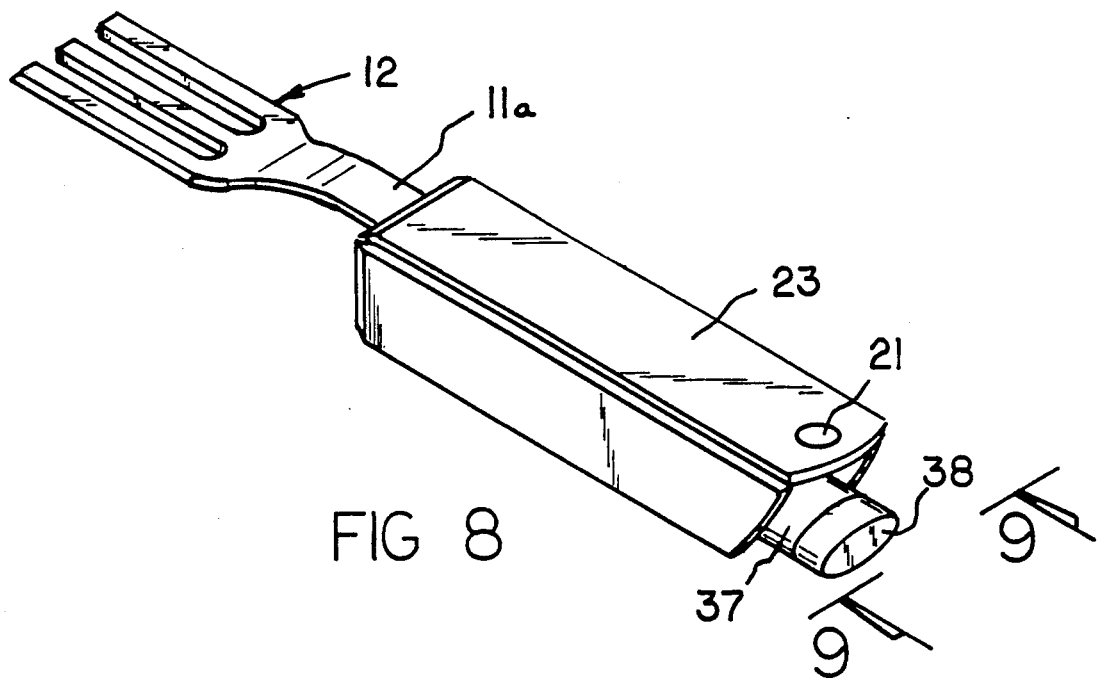
FIG. 8 is an isometric rear view of the instant invention.
Figure 9:
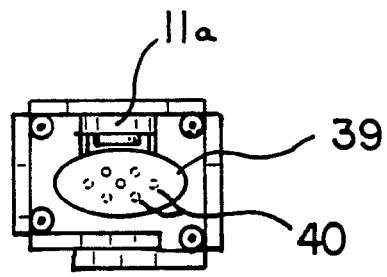
FIG. 9 is an orthographic view, taken along the lines 9—9 of FIG. 8 in the direction indicated by the arrows.

The FIGS. 8 and 9 illustrate the use of a handle end portion 37 mounting a reservoir 38 below the handle end portion 37 projecting rearwardly of the handle 11a, to include a reservoir cap 39 overlying the matrix of end wall openings 40 for dispensing of various components such as salt, pepper, and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pizza fork apparatus, comprising,
   an elongate handle, the elongate handle including a fork head integrally mounted to the handle at a forward distal end of the handle, with the fork head including a plurality of parallel tines, the parallel tines include a medial tine, a right tine spaced to a right side of the medial tine, and a left tine spaced from the left side of the medial tine, wherein the medial tine, the right tine, and the left tine are each arranged in a parallel coextensive relationship, and
   a first gap extending between the medial tine and the right tine, and a second gap extending between the medial tine and the left tine, and
   a right cutting outer edge mounted coextensively to an outer edge of the right tine projecting exteriorly of the fork head, and a left cutting outer edge formed coextensively to an outer edge of the left tine projecting exteriorly of the fork head, wherein the right cutting outer edge and the left cutting outer edge are arranged in a parallel relationship, and
   the elongate handle includes an elongate enclosed slot oriented medially of the handle arranged with the handle in a surrounding relationship relative to the slot, with the slot positioned medially of the handle, and a slider pin mounted within the slot, and a spatula member mounted to the slider pin permitting projecting of the spatula plate to a forward position over the fork head from a rear position positioned over the handle, and the spatula member includes a first plate mounted to the slider pin and a second plate and a third plate mounted to opposed sides of the first plate, wherein the second plate and the third plate are arranged coextensive with the first plate, and a fourth plate and fifth plate mounted hingedly to the second plate and third plate respectively, and a first hinge hingedly interconnecting the first plate to the second plate, and a second hinge hingedly connecting the first plate to the third plate, and a third hinge hingedly mounting the second plate to the fourth plate, and a fourth hinge hingedly mounting the third plate to the fifth plate, wherein the hinges are arranged in a parallel relationship relative to one another.

2. An apparatus as set forth in claim 1 wherein the first plate includes a first plate edge, the second plate includes a second plate edge, the third plate includes a third plate edge, the fourth plate includes a fourth plate edge, the fifth plate includes a fifth plate edge, wherein each edge is arranged in a linearly aligned relationship when the spatula member is in the forward position.

3. An apparatus as set forth in claim 2 wherein the handle includes a handle end portion, wherein the handle end portion includes a reservoir mounted below the handle end portion projecting rearwardly of the handle, wherein the reservoir includes an end wall, the end wall including a matrix of end wall openings, and a reservoir cap arranged for selective mounting over the end wall.

* * * * *